（12） United States Patent
Thota et al.

(10) Patent No.: US 8,516,040 B2
(45) Date of Patent: Aug. 20, 2013

(54) LOAD REDUCTION AND RESPONSE TIME REDUCTION FOR WEB-BASED APPLICATIONS

(75) Inventors: Ravi G. Thota, Hyderabad (IN); Phani Kumar Nunna, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 332 days.

(21) Appl. No.: 12/938,520

(22) Filed: Nov. 3, 2010

(65) Prior Publication Data

US 2012/0110061 A1    May 3, 2012

(51) Int. Cl.
*G06F 15/16* (2006.01)
*G06F 15/173* (2006.01)

(52) U.S. Cl.
USPC ........... 709/203; 709/217; 709/226; 709/242; 709/245; 709/230; 709/225; 709/219; 709/229; 726/4; 726/15; 726/22; 726/26; 726/27; 713/187; 713/188

(58) Field of Classification Search
USPC .................................. 709/203, 217, 223–229
See application file for complete search history.

(56) References Cited

U.S. PATENT DOCUMENTS

| | | | | |
|---|---|---|---|---|
| 6,496,865 | B1 * | 12/2002 | Sumsion et al. | 709/229 |
| 6,546,473 | B2 * | 4/2003 | Cherkasova et al. | 711/158 |
| 7,401,141 | B2 * | 7/2008 | Carusi et al. | 709/224 |
| 7,607,085 | B1 * | 10/2009 | Lassesen | 715/264 |
| 7,836,502 | B1 * | 11/2010 | Zhao et al. | 726/22 |
| 7,934,003 | B2 * | 4/2011 | Carusi et al. | 709/228 |
| 2002/0010753 | A1 * | 1/2002 | Matsuoka et al. | 709/217 |
| 2002/0184448 | A1 * | 12/2002 | Cherkasova et al. | 711/133 |
| 2004/0044740 | A1 * | 3/2004 | Cudd et al. | 709/217 |
| 2005/0021736 | A1 * | 1/2005 | Carusi et al. | 709/224 |
| 2008/0262797 | A1 * | 10/2008 | Carusi et al. | 702/186 |
| 2011/0307540 | A1 * | 12/2011 | Martin | 709/203 |

* cited by examiner

*Primary Examiner* — Jude J Jean-Gilles

(57) ABSTRACT

A device may send a resource from a server device to a proxy device and store the resource on the proxy device as a copy. The device may configure the server device to send a replacement document in place of a web document to a client device in a network when the server device receives a request for the web document from the client device, the web document including a first reference to the resource and the replacement document including a second reference to the copy. The device may configure the proxy device to send the copy to the client device when the client device receives the replacement document from the server device and sends a request for the copy to the proxy device based on the second reference included in the replacement document.

20 Claims, 10 Drawing Sheets

902 ↓

| TIME | METHOD | TYPE | URL |
|---|---|---|---|
| 1.255 | GET | image/gif | Org.com:8080/vsoui/images/button_close.gif |
| 0.984 | GET | image/gif | Org.com:8080/vsoui/images/blank.gif |
| 1.067 | GET | image/gif | Org.com:8080/vsoui/images/globalnav_bkrd.gif |
| 1.205 | GET | image/png | Org.com:8080/vsoui/images/filter_top.png |
| 1.278 | GET | image/png | Org.com:8080/vsoui/images/contentbox_top_left.png |
| 1.395 | GET | image/png | Org.com:8080/vsoui/images/contentbox_top_right.png |
| 1.148 | GET | image/png | Org.com:8080/vsoui/images/Cam.png |

| TIME | METHOD | TYPE | URL |
|---|---|---|---|
| 0.092 | GET | image/png | Http://resources.org.com:8080/resourcepool/images/Cam.png |
| 0.646 | GET | image/gif | Http://resources.org.com:8080/resourcepool/images/button_close.gif |
| 0.018 | GET | image/gif | Http://resources.org.com:8080/resourcepool/images/blank.gif |
| 0.031 | GET | image/gif | Http://resources.org.com:8080/resourcepool/images/globalnav_bkrd.gif |
| 0.849 | GET | image/png | Http://resources.org.com:8080/resourcepool/images/filter_top.png |
| 0.080 | GET | image/png | Http://resources.org.com:8080/resourcepool/images/contentbox_top_left.png |
| 0.113 | GET | image/png | Http://resources.org.com:8080/resourcepool/images/contentbox_top_right.png |

FIG. 9B

LOAD REDUCTION AND RESPONSE TIME REDUCTION FOR WEB-BASED APPLICATIONS

BACKGROUND

Over the years, web applications and network components supporting such applications have become more complex. For example, a typical modern enterprise web application includes not only browsers and web servers, but also other components, such as a common gateway interface scripts, application servers, databases, etc. A network infrastructure to support such applications typically includes load balancers, firewalls, enterprise-wide directory access protocol (LDAP) servers, single sign on-agents, etc.

Although many of these devices/components can improve the scalability of web services and network security, they also have the potential to increase inefficiencies that are associated with the services. For example, including an application server in the architecture of a web application can increase the overall latency in response time of the application.

BRIEF DESCRIPTION OF THE DRAWINGS

FIG. 9A shows a table of exemplary statistics associated with accessing resources on the server device of FIG. 2; and FIG. 9B shows a table of exemplary statistics associated with accessing resources on the proxy device of FIG. 2.

DETAILED DESCRIPTION

The following detailed description refers to the accompanying drawings. The same reference numbers in different drawings may identify the same or similar elements.

As described herein, a resource migration device may reduce load on a server and decrease its response time. By copying resources on the server (or on devices in a network that is local to the server) to a proxy and reconfiguring network elements, the resource migration device may cause client browsers to send requests for the resources to the proxy rather than to the server. Consequently, the server may experience decreased network load, and the client browsers may spend less time in uploading the resources.

Figure 1A:
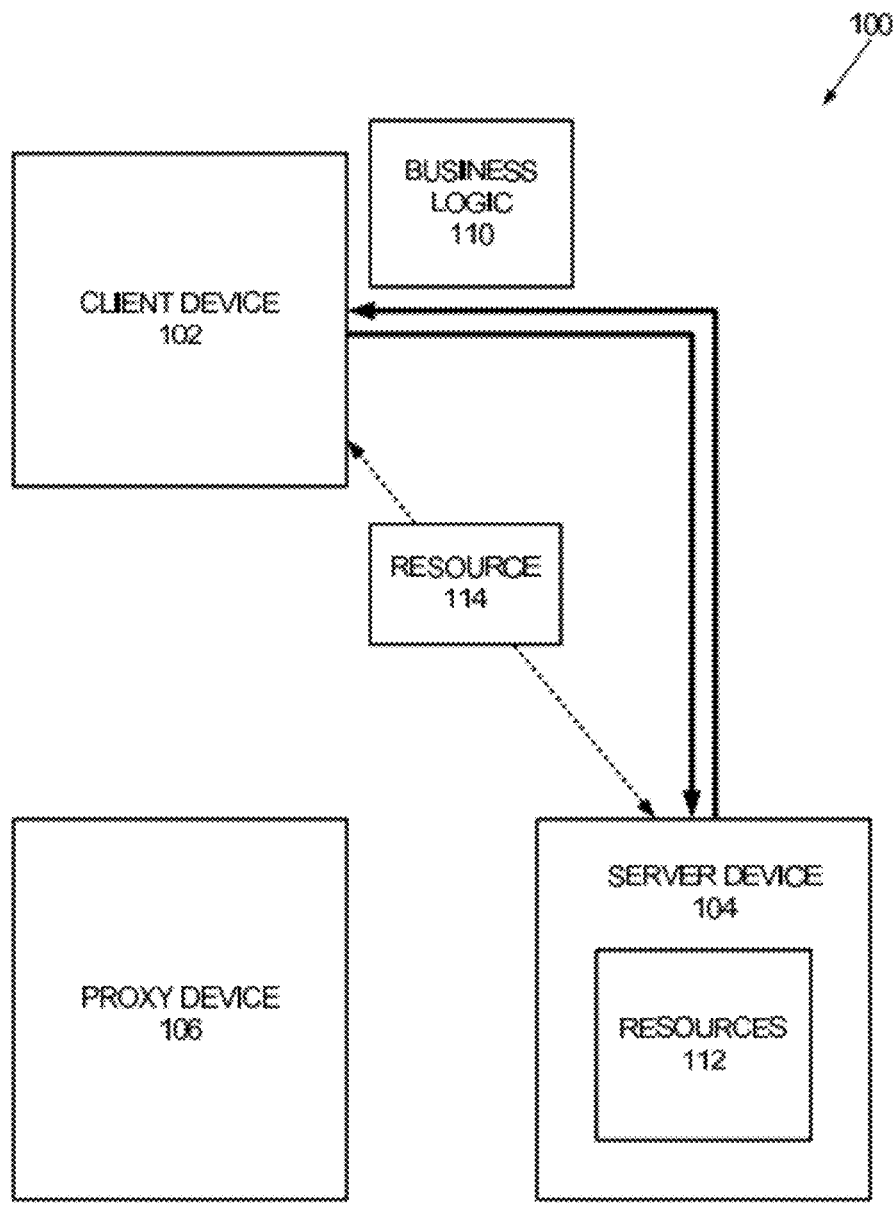
FIGS. 1A and 1B illustrate concepts described herein.
Figure 1B:
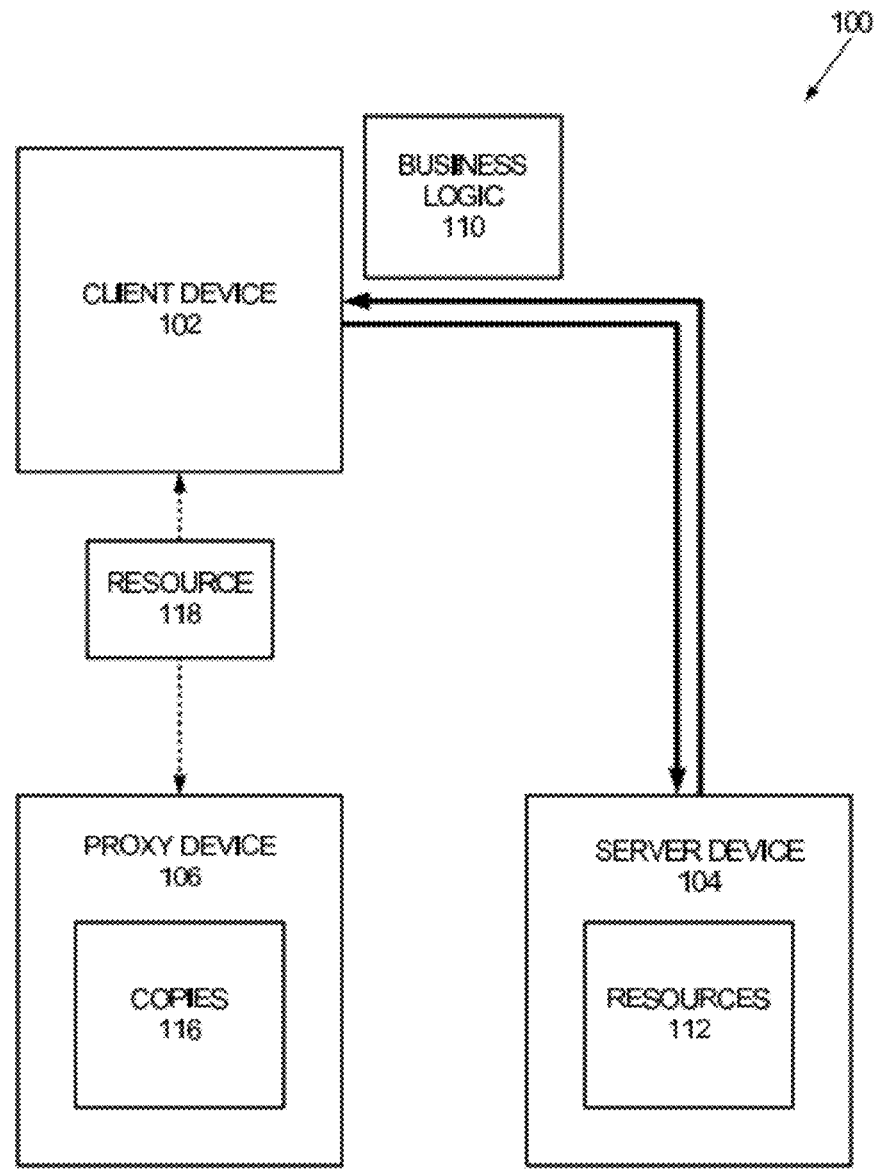

FIGS. 1A and 1B illustrate the concepts described herein. In FIGS. 1A and 1B, a system 100 implements a web application. As shown, system 100 includes a client device 102, a server device 104, and a proxy device 106. Devices 102 through 106 are described below in greater detail with reference to FIGS. 3 through 8. Although system 100 may include other network devices or components, for simplicity, they are not illustrated in FIGS. 1A and 1B.

In FIGS. 1A and 1B, server device 104 includes resources 112 that are associated with the web application implemented by system 100. In a different implementation, other devices in a network local to the server device 104 may include resources 112. In addition, proxy device 106 may be physically closer to client device 102 than server device 104 (e.g., in a local network). Hence, latency between client device 102 and proxy device 106 may be less than that between client device 102 and server device 104.

FIG. 1A shows operation of system 100 before a resource migration device (not shown) has reconfigured system 100. In FIG. 1A, client device 102 sends browser requests to server device 104. As shown, upon processing the requests, server device 104 responds with a web page 110 that includes business logic implemented by the application of system 100. When client device 102 receives web page 110, client device 102 sends additional requests to access resources that are associated with web page 110 (e.g., a subset of resources 112 and referenced from web page 110 via links) to server device 104. Upon receiving the requests, server device 104 may send resource 114 to client device 102.

FIG. 1B shows operation of system 100 after the resource migration device has reconfigured system 100. As shown, after the reconfiguration, proxy device 106 includes copies 116 of resources 112 that are on server device 104. In FIG. 1B, when client device 102 sends browser requests to server device 104, as in FIG. 1A, server device 104 responds with web page 110. However, when client device 102 receives web page 110, client device 102 may send requests for resources that are associated with web page 110 to proxy device 106, rather than to server device 104. Accordingly, in response, proxy device 106 may send resource 118 to client device 102.

By providing proxy device 106 with copies 116 of resources 112, the resource migration device may cause client device 102 to send requests for resources 112 to proxy device 106, reducing load on server device 104. Furthermore, client device 102 may experience faster upload of resource 118 than resource 114, due to less latency between proxy device 106 and client device 102.

Figure 2:
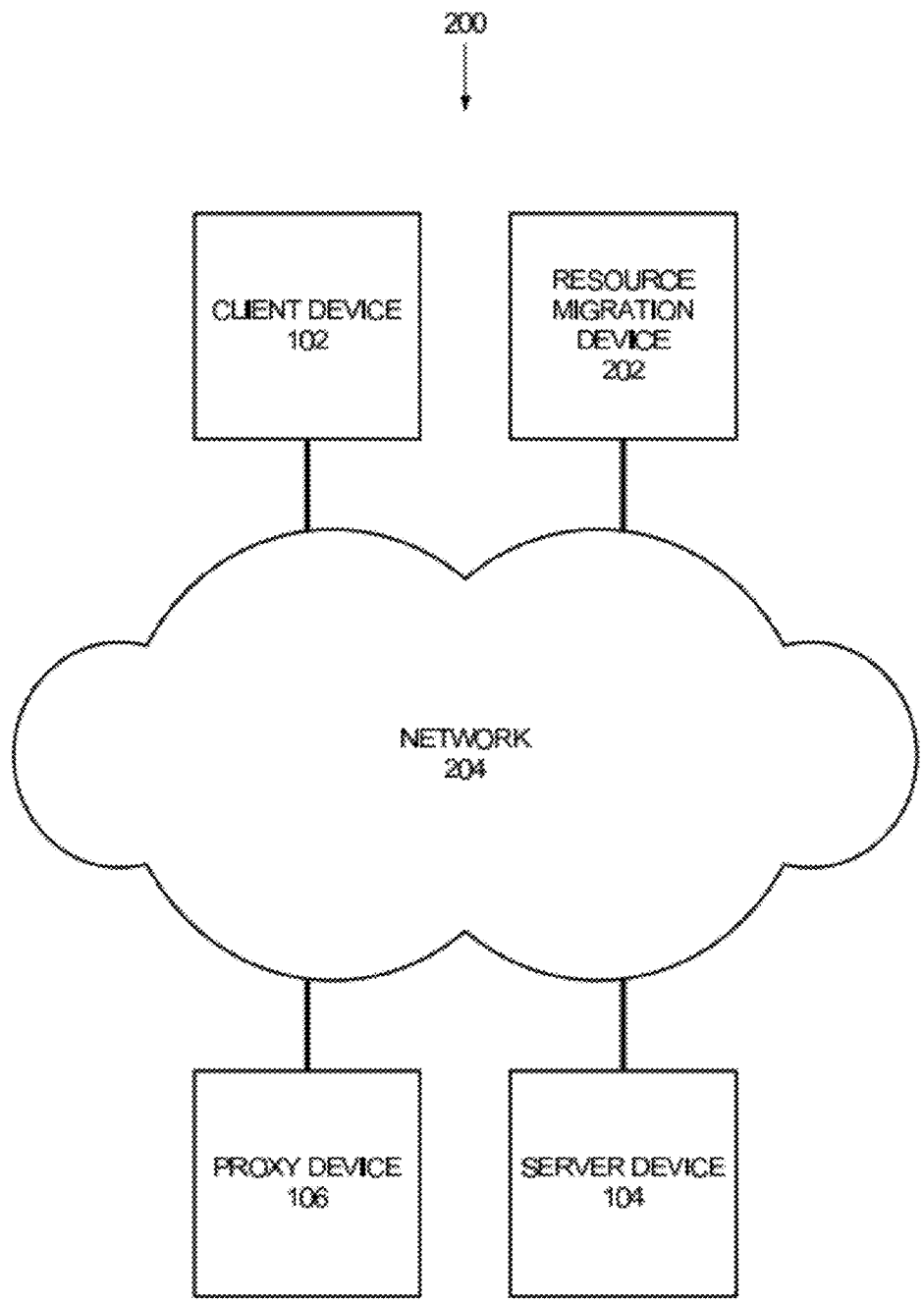
FIG. 2 illustrates an exemplary network in which the concepts described herein may be implemented.

FIG. 2 illustrates an exemplary network 200 in which the concepts described herein may be implemented. As shown, network 200 may include a client device 102, server device 104, proxy device 106, resource migration device 202, and network 204.

Client device 102 may include a web client or a browser, for accessing, processing, and/or displaying information from server device 104, proxy device 106 and/or other devices in network 204. The web client/browser may also be capable of executing instructions (e.g., an Applet, Java scripts, etc.) that are received from network devices (e.g., server device, 104, proxy device 106, etc.).

In some implementations, the web client/browser may include plug-ins and/or components that enable the web client/browser to view, edit, or upload data/information in different formats, such as portable document format (PDF), postscript, extensible markup language (XML), Microsoft Power Point™, video formats (e.g., Motion Picture Experts Group (MPEG), QuickTime™, etc.), audio formats, image formats (e.g., graphics interchange format (GIF), joint photographic experts group (JPEG), portable network graphics (PNG), tagged image file format (TIFF), etc.), etc.

Server device 104 may provide/receive information (e.g., web documents) to/from client device 102. In providing the information, server device 104 may send a core document that is static or is dynamically generated. The core document may include links and/or references to resources that reside on server device 104, on devices that are on a local network in which server device 104 is located, and/or on proxy device 106.

Proxy device 106 may include resources that are associated with core documents. The resources may include, for example, images, videos, audios, cascading style sheets (CSS), documents, scripts, programs, etc. Proxy device 106 may send the resources to client device 102 in response to requests from the browser/web client on client device 102.

Resource migration device 202 may reconfigure client device 102, server device 104, proxy device 106, and/or other devices in network 204. The reconfiguration may include allocating a storage space on proxy device 106 (e.g. create a physical volume, create a logical volume based on the physical volume, mount the logical volume, etc.), installing a web server and/or application server on proxy device 106, copying resources and/or databases from server device 104 (or devices in a network that is local to server device 104) to the storage space on proxy device 106, remapping references to original resources on server device 104 to their copies on proxy device 106, restarting processes or devices in network 200, etc.

Network 204 may include one or more wired and/or wireless networks that are capable of exchanging information, such as voice, video, documents, multimedia, text, etc. For example, network 204 may include one or more public switched telephone networks (PSTNs) or another type of switched network. Network 204 may also include a number of transmission towers for receiving wireless signals and forwarding the signals toward the intended destination. Network 204 may further include one or more packet switched networks, such as an Internet protocol (IP) based network, a local area network (LAN), a wide area network (WAN), a personal area network (PAN), an intranet, the Internet, or another type of network that is capable of exchanging information.

Depending on the implementation, network 200 may include additional, fewer, different, or a different arrangement of devices than those illustrated in FIG. 2. For example, network 200 may include thousands of client devices 102, additional server devices 104, and proxy devices 106, etc. In another example, functionalities of server device 104 and/or proxy device 106 may be distributed over several devices. Although network 204 may include other types of network elements, such as routers, bridges, switches, etc., they are not illustrated in FIG. 2 for simplicity.

Figure 3:
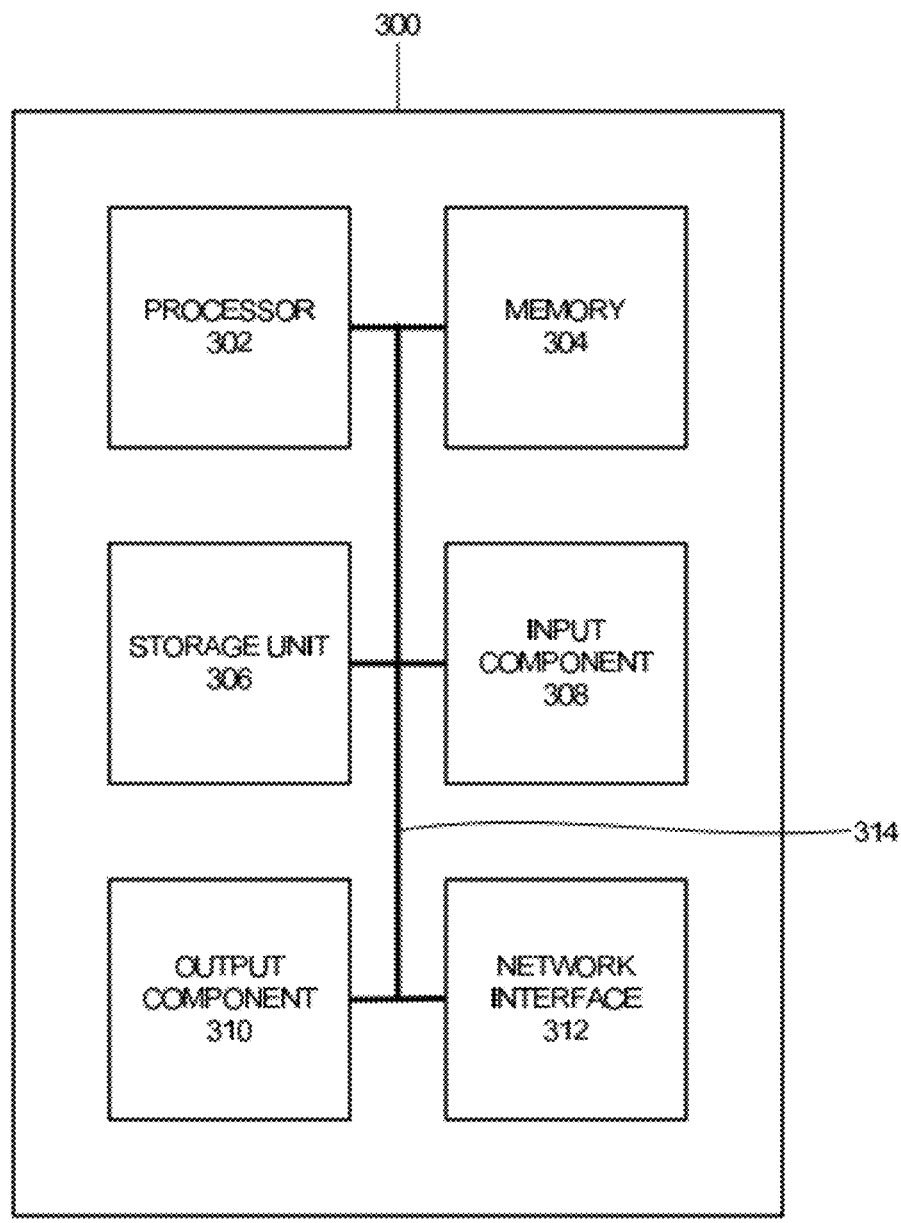
FIG. 3 is a block diagram illustrating exemplary components of a network device of FIG. 2.

FIG. 3 is a block diagram of an exemplary network device 300, which may correspond to one or more of devices 102, 104, 106, 202 and/or devices in network 204. As shown, network device 300 may include a processor 302, memory 304, storage unit 306, input component 308, output component 310, network interface 312, and communication path 314. In different implementations, network device 300 may include additional, fewer, different, or different arrangement of components than the ones illustrated in FIG. 3. For example, network device 300 may include plug-in cards for connecting to external buses.

Processor 302 may include a processor, a microprocessor, an Application Specific Integrated Circuit (ASIC), a Field Programmable Gate Array (FPGA), and/or other processing logic (e.g., embedded devices) capable of controlling network device 300. Memory 304 may include static memory, such as read only memory (ROM), and/or dynamic memory, such as random access memory (RAM), or onboard cache, for storing data and machine-readable instructions (e.g., programs, scripts, etc.). Storage unit 306 may include a floppy disk, CD ROM, CD read/write (R/W) disc, and/or flash memory, as well as other types of storage devices (e.g., hard disk drive) for storing data and/or machine-readable instructions (e.g., a program, script, etc.). Depending on the context, the term "memory," "storage," "storage device," and/or "storage unit" may be used interchangeably. For example, a "computer-readable storage device" may refer to both a memory and/or storage device.

Input component 308 and output component 310 may provide input and output from/to a user to/from network device 300. Input/output components 308 and 310 may include a display screen, a keyboard, a mouse, a speaker, a microphone, a camera, a DVD reader, Universal Serial Bus (USB) lines, and/or other types of components for converting physical events or phenomena to and/or from signals that pertain to network device 300.

Network interface 312 may include a transceiver (e.g., a transmitter or receiver) for network device 300 to communicate with other devices and/or systems. For example, via network interface 312, network device 300 may communicate over a network, such as the Internet, an intranet, a terrestrial wireless network (e.g., a WLAN, WiFi, WiMax, etc.), a satellite-based network, optical network, etc. Network interface 312 may include a modem, an Ethernet interface to a LAN, and/or an interface/connection for connecting network device 300 to other devices (e.g., a Bluetooth interface).

Communication path 314 may provide an interface through which components of network device 300 can communicate with one another.

Figure 4:
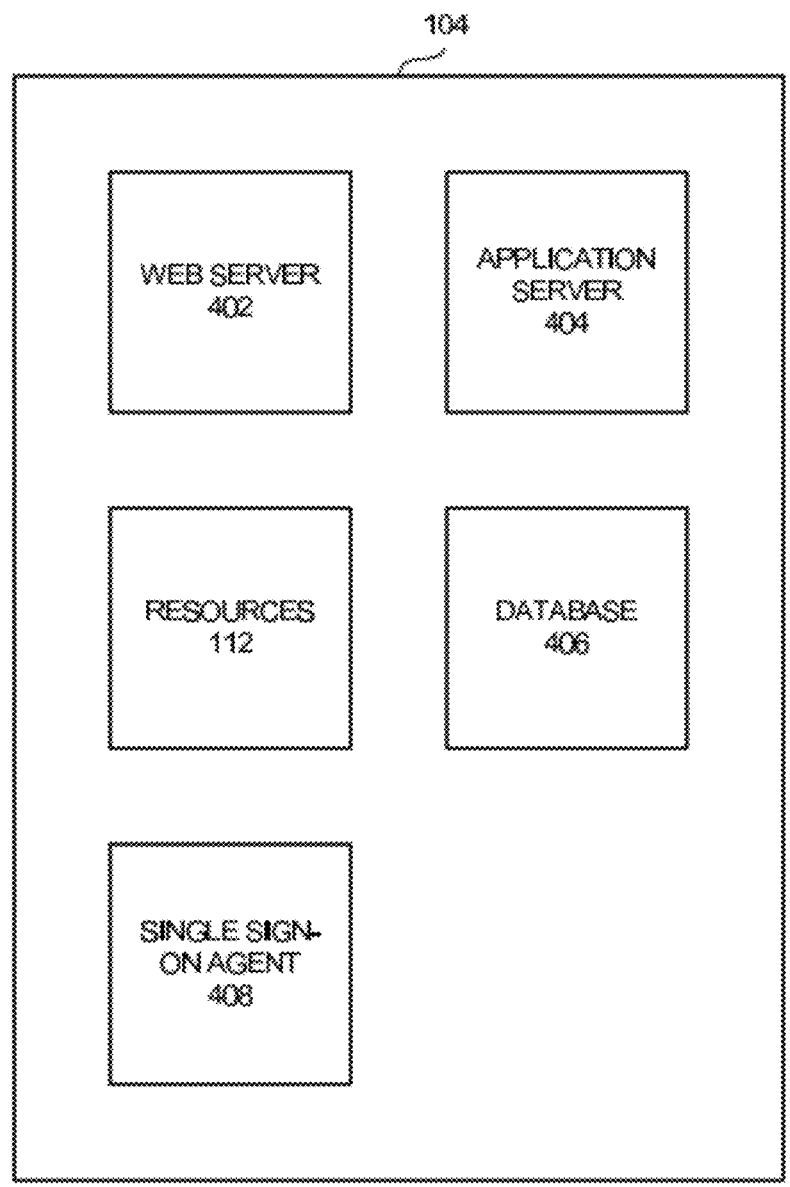
FIG. 4 is a block diagram of exemplary functional components of the server device of FIG. 2 according to one implementation.

FIG. 4 is a block diagram of exemplary functional components of server device 104. As shown, server device 104 may include a web server 402, application server 404, web resources 112, a database 406, and a single sign-on agent 408. Components 402, 404, 112, 406, and 408 are shown for illustrative purposes, and in an actual implementation, server device 104 may include additional, fewer, different, or a different arrangement of components than those illustrated in FIG. 4. For example, server device 104 may include an operating system, device drivers, event manager, communication software, etc.

Web server 402 may provide a web document and/or associated resources to client device 102 upon receiving a hypertext transfer protocol (HTTP) request from client device 102. In addition, web server 404 may receive information from client device 102 via HTTP commands (e.g., POST).

In some configurations, when web server 104 receives a HTTP request, web server 402 may fetch and send a resource or data from resources 112 or database 406 to client device 102. In other configurations, web server 104 may relay the request to application server 404. In these cases, application server 404 may serve an application, requested resources, and/or data to client device 102.

Application server 404 may provide services to client device 102. When application server 404 receives a request or notification from web server 402, application server 404 may provide an application for rendering the service to the browser and/or web client. The application may be already in existence, or instantiated by application server 404. In some instances, application server 404 may obtain and send a resource/data in resources 112/database 406 or on a device that is in a network local to server device 104.

Resources 112 may include web resources, such as cascading style sheets (CSSs), linked images (e.g., GIF images, JPEG images, PNG images, TIFF images, etc.), linked documents (e.g., PDF, XML, Microsoft Word™, Microsoft PowerPoint™, and/or other types of documents), audio files, video files, etc.).

Database 406 may include information/data that web server 402 and/or an application (e.g., an application provided or created via application server 404) may provide to client device 102 in response to browser/web client request. In some instances, web server 402 and/or the application may use data/information in database 406 to dynamically generate or create a web page for the browser/web client. In some implementations, database 406 may be updated via web server 402 or an application.

Single sign-on agent 408 may authenticate a user that accesses particular services, web pages, or resources on a local network in which server device 104 resides. Once the user is authenticated, the user may access other services, web pages, or resources without re-authentication.

To provide the user with access to other services, web pages, and/or resources in a local network without re-authenticating the user, when single sign-on agent 408 successfully authenticates the user, single sign-on agent 408 may record, at a local registry, that the user has been authenticated. When the user subsequently accesses other local services, web pages, and/or resources, single sign-on agent 408 on server device 104 or on another local network device may consult the registry, without prompting the user. Subsequently, single sign-on agent 408 may determine whether the user has the authority to access the other local services, web pages, and/or resources based on the registry information.

For example, assume that single sign-on agent 408 authenticates a user when client device 102 accesses web page X via web server 402. When the browser on client device 102 receives the web page X, the browser issues requests for resources to server device 104. Consequently, single sign-on agent 408 may determine, in response to the requests, whether the user has been already authenticated, based on registry information. Such determinations may require additional computation and/or network bandwidth.

Figure 5:
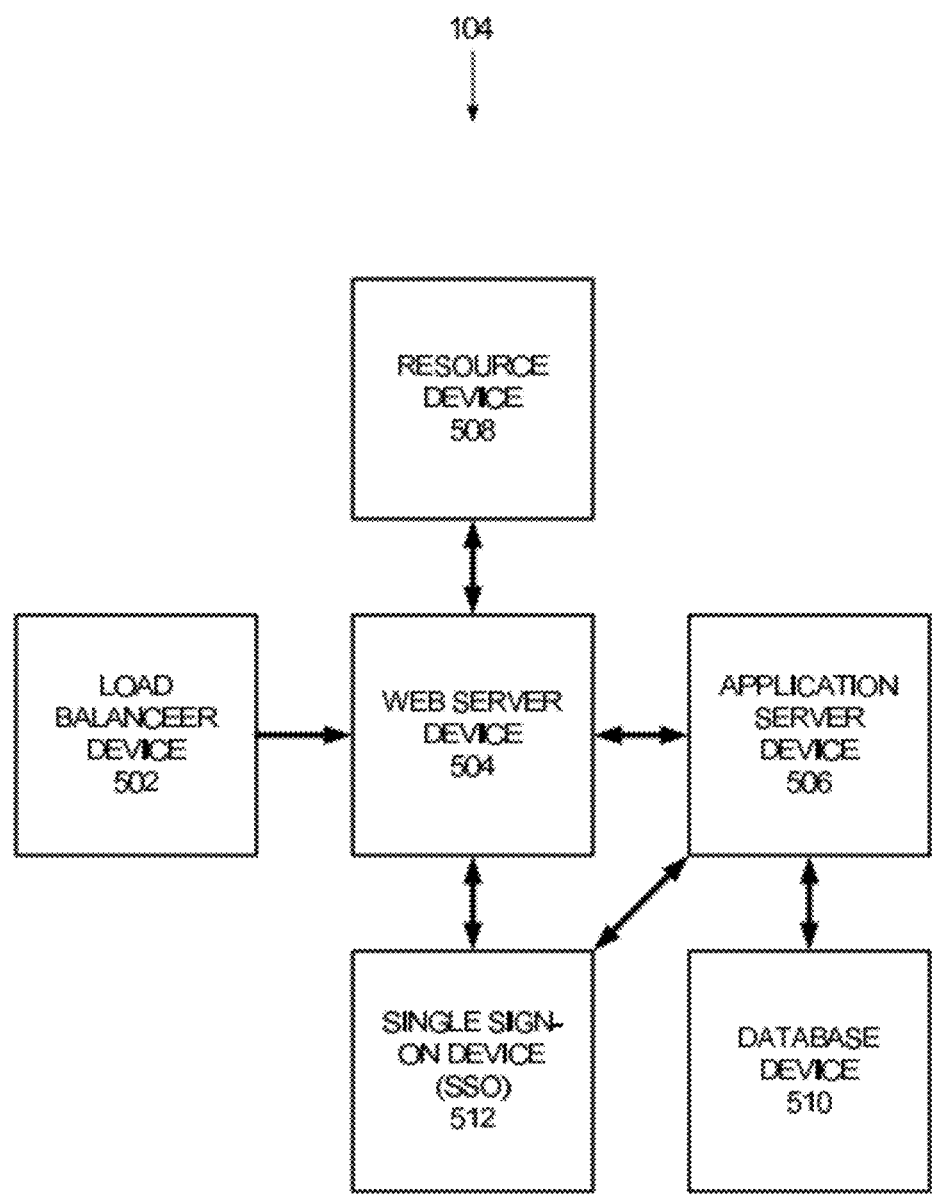
FIG. 5 is a block diagram illustrating exemplary components of the server device of FIG. 2 according to another implementation.

FIG. 5 is a block diagram illustrating exemplary components of server device 104 according to another implementation. In this implementation, as shown, server device 104 is implemented as multiple network devices 502 through 512. Accordingly, server device 104 may include a load balancer device 502, web server device 504, application server device 506, resource device 508, database device 510, and single sign-on device 512. Although server device 104 according to FIG. 5 may include additional load balancer devices, web server devices 504, application server devices, single sign-on devices, and database devices, for simplicity, they are not illustrated in FIG. 5.

Each of devices 504 through 510 may include each of corresponding components 402, 404, resources 112, and database 406, respectively. Consequently, the functionalities of devices 504 through 510 may include the functionalities of the corresponding components 402, 404, resources 112, and database 406.

One difference between the implementations of FIGS. 4 and 5 is that, in FIG. 4, components 112 and 402 through 408 may communicate with one another via Inter-Process Communication (IPC) mechanisms, such as semaphores, locks, shared memories, etc. In FIG. 5, devices 504 through 512 may communicate with one another over a local network, in accordance with a communication protocol or specification, such as the Remote Method Invocation (RMI), Common Object Request Broker Architecture (CORBA), Remote Procedure Call (RPC), Simple Object Access Protocol (SOAP), etc.

Another difference between the implementations of FIGS. 4 and 5 may be that, in FIG. 5, load balancer device 502 distributes incoming requests for services over multiple web server devices, application server devices, database devices, etc., in order to avoid overloading a single device. Although load balancer 502 may allow server device 104 to scale, load balancer 502 may also increase potential response time of server device 104 to client requests. When a browser/web client requests, from server device 104, resources that are associated with a web page, each of the requests must pass through load balancer 502, increasing overall load on server device 104.

Yet another difference between the implementations may be that, in FIG. 4, single sign-on agent 408 handles incoming requests from a browser and/or web clients, whereas in FIG. 5, single sign-on device 512 may include a registry that receives authorization/authentication queries from single sign-on agents (not shown in FIG. 5) hosted on web server device 504 and/or application server device 506. Each request for a resource may trigger single sign-on agent 408 on web server devices 504 and/or application server devices 506, generating authentication requests, further increasing the load on server device 104.

Figure 6:
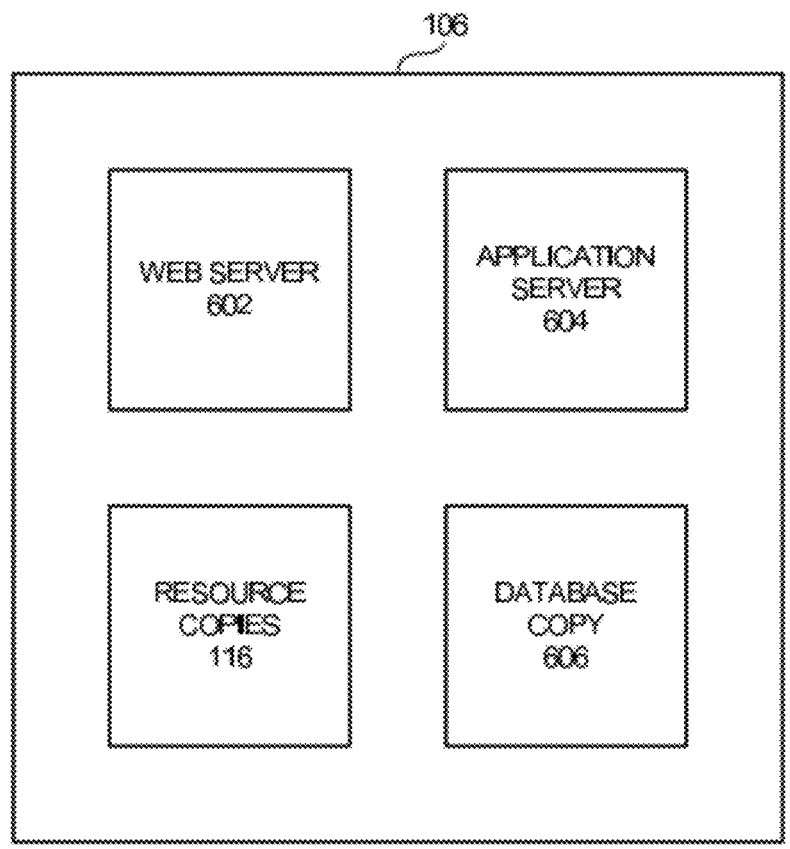
FIG. 6 is a block diagram illustrating exemplary functional components of the proxy device of FIG. 2.

FIG. 6 is a block diagram illustrating exemplary functional components of proxy device 106. As shown, proxy device 106 may include a web server 602, application server, resource copies 116 and database copy 606. Depending on the implementation, proxy device 106 may include additional, fewer, different, or a different arrangement of components than those illustrated in FIG. 6 (e.g., operating system, Transmission Control Protocol (TCP)/IP stack, device drivers, etc.).

Web server 602 may provide a web document and/or associated resources to client device 102 upon receiving a HTTP request from client device 102. In addition, web server 602 may receive information from client device 102 via HTTP commands. Application server 604 may provide services to client device 102, similarly as application server 404 in server device 104. In contrast to application server 404, however, application server 604 may obtain resources from resource copies 116 rather than resources 112.

In FIG. 6, components 602 through 505 may be installed on proxy device 106 when resource migration device 202 reconfigures network 200. In installing the components, resource migration device 202 may also configure web server 602, application server 604, resource copies 116 (e.g., place copies of resources 112 to a particular directory), and/or database copy 606.

Figure 7:
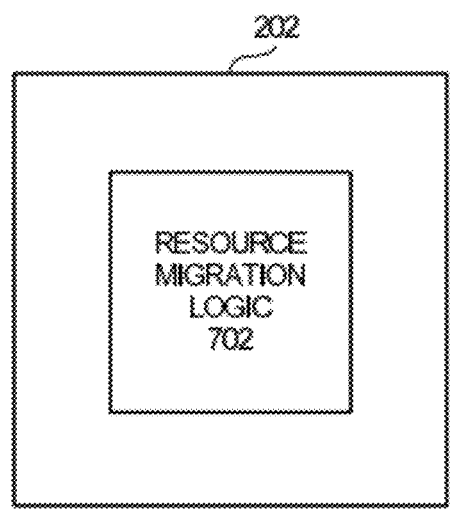
FIG. 7 is a block diagram illustrating an exemplary functional component of the resource migration device of FIG. 2.

FIG. 7 is a block diagram illustrating an exemplary functional component of resource migration device 106. As shown, resource migration device 106 may include resource migration logic 702. Although resource migration device 106 may include other components (e.g., operating system, applications, device drivers, web server, etc.), for simplicity, they are not illustrated in FIG. 7. In addition, in other implementations, resource migration logic 702 may be included in another type of network device in FIG. 2 (e.g., server device 104, proxy device 106, etc.).

Figure 8:
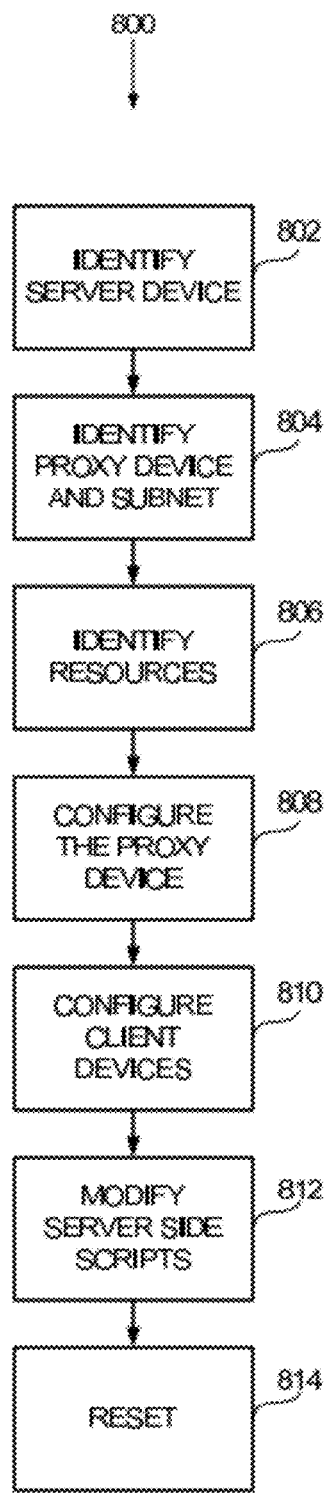
FIG. 8 is a flow diagram of an exemplary process that is associated with the resource migration logic of the resource migration device of FIG. 2.

Resource migration logic 702 may reconfigure client device 102, server device 104, proxy device 106, and/or other devices in network 204. FIG. 8 is a flow diagram of an exemplary process that is associated with the reconfiguration. Although, in the following description, some or all of blocks 802-814 (or the actions associated with blocks 802-814) are described as being performed by resource migration logic 702, in another implementation, blocks 802-814 (or the actions associated with blocks 802-814) may also be fully or partly performed by a network operator, user, system administrator, another device or component. Assume that resource migration logic 702 is running on resource migration device 202

Resource migration logic 702 may identify server device 104 whose web resources may be migrated to a proxy device (e.g., proxy device 106) (block 802). In some implementations, resource migration logic 702 may identify the server device based on operator/user input. In other implementations, resource migration logic 702 may identify server device 104 based on measured delays between client requests and times of server responses, network traffic, load on server devices, etc.

Resource migration logic 702 may identify proxy device 106 and a subnet and/or region to which proxy device 106 is to provide resources (block 804). In some implementations, resource migration logic 702 may identify proxy device 106, the subnet, and/or the region based on user input. In other implementations, resource migration logic 702 may automatically make the identifications based on a set of criteria, such as an average latency between a client device in the subnet and a candidate proxy device, physical proximity of a proxy device to client devices in the subnet, etc.

Resource migration logic 702 may identify resources that are to be copied or migrated from server device 104, which is identified at block 802, to proxy device 106, which is identified at block 804 (block 806). In some implementations, resource migration logic 702 may receive user input that identifies the individual resources to be copied or migrated. In other implementations, resource migration logic 702 may determine whether the resources are to be copied or migrated based on pre-defined criteria, such as the average number of hits on a resource per unit time, latency in delivering the resource from web server 402 on server device 104 to client device 102, etc.

Resource migration logic 702 may configure proxy device 106 (block 808). The configuration may include reserving storage space on proxy device 106, copying resources 112 and/or database 406 from server device 104 to proxy device 106, installing web server 602 and/or an application server 604 on proxy device 106, and restarting web server 602, application server 604, and/or database 606 on proxy device 106.

In reserving the storage space on proxy device 106, resource migration logic 702 may estimate the amount of space needed to install web server 602 (if not already installed), to install application server 604 and to store resources 116 or database 606 selected/identified at block 806. If a logical volume (at a drive on the proxy device or on a local Network Attached Storage (NAS) device attached to proxy device 106), on which resources 116, database 606, web server 602, and/or application server 604 are to be stored or installed, does not exist, resource migration logic 702 may create a new logical volume and mount the volume on a mount point (e.g., ./applications, ./web, etc.), by executing a sequence of commands (e.g., commands for creating a physical volume, carving out a logical volume from the physical volume, etc.). If the logical volume already exists, but it is not large enough to accommodate web server 602, application server 604, resources 116, and/or database 606, resource migration logic 702 may modify the logical volume (e.g., unmount the logical volume from a mount point, expand or increate the logical volume, remount the logical volume, etc.). If there is insufficient physical storage space, resource migration logic 702 may alert a user or a network operator/administrator.

Once the resource migration logic 702 has reserved sufficient storage space, resource migration logic 702 may copy resources 112 and/or database 406 from server device 104 to proxy device 106. In addition, resource migration logic 702 may install web server 602 and/or application server 604 on proxy device 106.

During the installation, resource migration logic 702 may set the /docbase of web server 602 and/or application server 604 to include copies 116 of resources. For example, assume that, on proxy device 106, a logical volume that includes resources copied from server device 104 is mounted on "resourcepool." Accordingly, resource migration logic 702 may set the default /docbase of web server 602 and/or application server 604 to be "resourcepool" on proxy device 106.

After the installations, resource migration logic 702 may perform other configurations necessary to run or operate web server 602 and/or application server 604 (e.g., set disk cache levels for web server 602, memory configurations, number of threads, etc.).

Resource migration logic 702 may configure client devices in the subnet or the region identified at block 704 (block 810). In one implementation, resource migration logic 702 may configure the client devices such that, at each of the client devices, the name (e.g., domain name) of proxy device 106 is associated with an IP address of proxy device 106.

For example, assume that the domain name of proxy device 106 is resource.organization.com. In addition, assume that the client devices are Windows™ client devices in a network in Canada. In such a case, resource migration logic 702 may modify C:\WINDOWS\system32\drivers\etc\hosts file in each of the client devices to include the following line describing a network address-name pair:

192.232.34.123 resource.organization.com, where 192.232.34.123 is the IP address of proxy device 106. The domain name of proxy device 106 is resource.organization.com.

Resource migration logic 702 may reconfigure web server 402 and/or application server 404 (or its equivalent, such as server side scripts), modify scripts/documents (e.g., server side scripts) and/or data (e.g., data in database 406) on server device 104 (block 812). In one implementation, the reconfiguration may be such that when web server 402 and/or application server 404 outputs a web document, a reference to any of resources 112, which is identified at block 806, is replaced with a reference to a copy in resources 116 in proxy device 106.

For example, assume that a server side script and/or an application server generates a web document with the following statement:

$$\text{<img src="./imges/image1"/>} \quad (1)$$

After the reconfiguration, web server 402, application server 404, and/or the script may generate a web document with the following in place of statement (1):

$$\text{<img src=http://resource.organization.com/resource-pool/imges/image1/>} \quad (2)$$

After the completion of blocks 802 through 812, when the browser on client device 102 accesses any of the resources via a Universal Resource Locator (URL) containing the string http://resource.organization.com/resourcepool/ (e.g., by referencing a resource via statement (2)), the browser may access the resourcepool directory (e.g., which is the /docbase of web server 602 in the above example) of web server 602 or application server 604 on proxy device 106.

In some implementations, resource migration logic 702 may further reconfigure web server 402, application server 404 (or its equivalent), scripts/documents, and/or data. For example, the reconfiguration may result in a session level variable being maintained on the server side when a browser accesses a web document from web server 402 and/or application server 404. Furthermore, the web document may include a clickable link (e.g., a link with text "Toggle Proxy Setup"). When a user at the browser on client device 102 activates the link (e.g., by clicking on the link), the session level variable may assume the value of true or false, to indicate whether web documents with references to resources 116 or web documents with references to resources 112 are to be generated. When the browser/web client receives a web document with references to resources 116 (rather than references to resources 112), the browser/web client may pull resources from proxy device 106, rather than from server device 104. The session variable may be toggled via JavaScript™ at the client side (e.g., via browser) or via Java Server Script (JSP) or Active Server Pages (ASP), etc. at the server side.

In another example, the reconfiguration may include tracking performance parameter(s) (e.g., load, latency, traffic, memory use, etc.) on server device 104, web server 402, and/or application server 404. When the tracked parameter(s) rises/falls above/below a threshold(s), web server 402 and/or application server 404 on server device 104 may generate web documents with references to resources 116 on proxy device 106, rather than web documents with references to resources 112 on server device 104. When the parameter(s) falls/rises below/above the threshold(s) (or another, lower threshold(s)), web server 402 and/or application server 404 on server device 106 may revert to its prior behavior.

Resource migration logic 702 may repeat blocks 802 through 814 for each of different subnets and/or geographical regions. That is, for each subnet or geographical region, process 800 may identify a proxy device (block 804), configure the proxy device (block 808), configure client devices in the subnet or the geographical region (block 810), etc. For example, for India, resource migration logic 702, at block 810, may modify C:\WINDOWS\system32\drivers\etc\hosts file in each of the client devices located in India to include the following line describing a network address-name pair:

192.232.34.87 resource.organization.com    (3)

For the U.S., resource migration logic 702 may modify C:\WINDOWS\system32\drivers\etc\hosts file in each of the client devices located in the U.S. to include the following network address-name pair:

192.232.34.12 resource.organization.com    (4)

In some implementations, resource migration logic 702 may make the changes in the client devices during off-hours, to avoid interfering with network operations.

In some implementations, at block 810, rather than inserting a network address-name pair in client device files, resource migration logic 702 may modify the corresponding address-name pairs or its equivalents in domain name servers that service the geographical region or subnet identified at block 804. This may have similar effects as modifying files in the client devices to provide for network address-name pair information describing a proxy device in a local network that includes the client devices.

FIG. 9A shows a table 902 of exemplary statistics associated with a browser accessing resources 112 on server device 104 according to one implementation. FIG. 9B shows a table 904 of exemplary statistics associated with the browser accessing resources 116 on proxy device 106 in the same implementation, after proxy device 106 and/or other devices in network 204 have been reconfigured in accordance with process 800. Tables 902 and 904 illustrate the browser spending less time accessing resources 116 on proxy device 106 than accessing resources 112 on server device 104.

In FIG. 9A, each of the rows in table 902 corresponds to statistics associated with accessing a specific resource of a web document from server device 104 (e.g., time spent on accessing a resource (e.g., an image file, a CSS, etc.), HTTP command that was issued to access the resource, type of resource accessed, and URL of the resource). For example, the last row of table 802 shows that 1.148 seconds was required to download a resource from sever device 104; the HTTP request or command issued from the client browser on client device 102 was GET; the type of resource accessed by the browser was a text/html file; and the URL of the resource was org.com:8080/vsoui/images/Cam.png. For simplicity, table 902 does not show the statistics of all of the resources associated with accessing the web document. Table 904 shows similar information as FIG. 8A, but for accessing resources 116 on proxy device 106.

Although not shown, the total time to access all of the resources on the web document on server device 104 is about 3.166 seconds. The total time to access all of the resources of the web document on proxy device 106, is about 1.358 seconds.

In the foregoing description, resource migration device 202 may reconfigure client devices, server devices, proxy devices, and/or other devices (e.g., domain name servers) for different geographical regions and/or subnets in accordance with process 800. In each subnet or geographical region, due to the reconfiguration, client device 102 may access resources and/or data, which are associated with web documents, from proxy device 106 rather than from server device 104. By providing proxy device 106 with copies 116 of resources and/or a copy of database 406, client device 102 may send requests for the resources/data to proxy device 106, reducing load on web server 402 and application server 404 on server device 104. This, in turn, may decrease memory consumption by web server 402 and/or application server 404.

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks have been described with regard to an exemplary process illustrated in FIG. 8, the order of the blocks may be modified in other implementations. In addition, non-dependent blocks may represent acts that can be performed in parallel to other blocks. Furthermore, process 800 may include additional, fewer, or different blocks than those illustrated in FIG. 8.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
sending a resource from a server device to a proxy device;
storing the resource on the proxy device as a copy;
configuring the server device to:
send a replacement document in place of a web document to a client device in a network when the server device receives a request for the web document from the client device, the web document including a first reference to the resource and the replacement document including a second reference to the copy; and
configuring the proxy device to:
send the copy to the client device when the client device receives the replacement document from the server device and sends a request for the copy to the proxy device based on the second reference included in the replacement document.

2. The method of claim 1, wherein sending the resource includes sending one of:
a cascading style sheet, image, script, video file, audio file, or document.

3. The method of claim 1, wherein configuring the proxy device includes:
installing a web server on the proxy device.

4. The method of claim 3, further comprising:
setting a default document base of the web server to include the copy.

5. The method of claim 3, wherein configuring the proxy device includes at least one of:
installing an application server on the proxy device; or
reserving storage space to store the copy and to install the web server on the proxy device.

6. The method of claim 1, further comprising at least one of:
modifying, in the client device, a file to include a network address-domain name pair associated with the proxy device; or
binding a network address of the proxy device to a domain name of the proxy device in a domain name server for the network.

7. The method of claim 1, further comprising:
selecting the proxy device for client devices in the network based on at least one of:
user input; or
latency associated with communication between the client device and the proxy device.

8. The method of claim 1, wherein configuring the server device further includes:
configuring the server device to generate a document in which references to resources in the server device are replaced with references to copies of the resources, the copies being stored on the proxy device when the client device requests the document.

9. The method of claim 1, wherein configuring the server device further includes:
configuring the server device to generate a document that includes a link to toggle a session level variable, the session level variable indicating whether the resource on the server device is to be sent to the client device or the copy on the proxy device is to be sent to the client device.

10. The method of claim 1, wherein configuring the server device further includes configuring the server device to:
track a performance parameter;
compare the performance parameter to a threshold; and
generate and send the replacement document in place of the web document to the client device upon receiving the request, based on a result of the comparison.

11. A method comprising:
sending, by a server device, a resource to a proxy device, the proxy device storing the resource as a copy;
outputting, by the server device, a replacement document in place of a web document when a request for the web document is received from a client device in a network, the web document including a first reference to the resource and the replacement document including a second reference to the copy; and
sending, by the server device, the replacement document to the client device, the client device configured to:
request the copy from the proxy device upon receiving the replacement document from the server device, based on the second reference in the replacement document, and
receive the copy from the proxy device.

12. The method of claim 11, wherein sending the resource includes sending one of:
a cascading style sheet, image, script, video file, audio file, or document.

13. The method of claim 11, further comprising:
configuring the server device to generate a document in which references to resources in the server device are replaced with references to copies of the resources, the copies being stored on the proxy device when the client device requests the document.

14. The method of claim 11, further comprising:
configuring the server device to generate a document that includes a link to toggle a session level variable, the session level variable indicating whether the resource on the server device is to be sent to the client device or the copy on the proxy device is to be sent to the client device.

15. The method of claim 11, further comprising tracking a performance parameter,
wherein the outputting the replacement document includes:
comparing the performance parameter to a threshold, and
outputting the replacement document in place of the web document when the request for the web document is received from the client device in the network, based on a result of the comparison.

16. A method comprising:
receiving a resource sent from a server device;
storing the resource as a copy;
sending the copy to a client device upon receiving a request for the copy from the client device, the client device configured to:
request the copy from a proxy device upon receiving a replacement document from the server device, based on a second reference in the replacement document, the server device configured to:
send the replacement document in place of a web document to the client device when the server device receives a request for the web document from the client device, the web document including a first reference to the resource and the replacement document including the second reference to the copy.

17. The method of claim 16, wherein the resource includes sending one of:
a cascading style sheet, image, script, video file, audio file, or document.

18. The method of claim 16, further comprising:
installing a web server on the proxy device.

19. The method of claim 18, further comprising:
setting a default document base of the web server to include the copy.

20. The method of claim 18, further comprising at least one of:
  installing an application server on the proxy device; or
  reserving storage space to store the copy and to install the web server on the proxy device.

\* \* \* \* \*